Feb. 14, 1939.  G. F. NADEAU ET AL  2,146,907
SUBBING PHOTOGRAPHIC FILM
Original Filed Dec. 28, 1935

Gale F. Nadeau & Clemens B. Starck,
INVENTORS

Patented Feb. 14, 1939

2,146,907

UNITED STATES PATENT OFFICE 2,146,907

SUBBING PHOTOGRAPHIC FILM

Gale F. Nadeau and Clemens B. Starck, Rochester, N. Y., assignors to Eastman Kodak Company, Rochester, N. Y., a corporation of New Jersey Substitute for abandoned application Serial No. 56,505, December 28, 1935. This application October 27, 1936, Serial No. 107,887

9 Claims. (Cl. 95—9)

This invention relates to photographic materials and more particularly to the subbing of photographic film.

This application is a substitute for abandoned application Serial No. 56,505.

In the manufacture of photographic safety film in which the film base is formed of a substantially non-inflammable derivative of cellulose, such as cellulose acetate, the manner of securing the proper adhesion of the various layers to the film base constitutes a serious problem. The degree of adhesion of the layers to the base must be regulated so that neither brittleness nor stripping results. If the degree of adhesion is too great, the film is brittle and cracks when bent, and on the other hand, if the degree of adhesion is too slight, the layers strip from the base or support when the film is treated in the processing baths.

Adhesion of the layers may be regulated by the use of solvents of varying strength, the degree of adhesion being controlled by the strength or solvent action of the solution for the adjoining layer. For example, a water solution of gelatin will not wet a cellulose organic derivative support such as cellulose acetate and it has, therefore, been the practice in subbing a film base of this type to use a solution of gellatin in an organic solvent capable of swelling or dissolving the film base. With this type of subbing solution, it has been found that when the solvent is of sufficient strength to afford good adhesion of the subbing layer to the film base, the resulting film is brittle, and if a weaker solvent is used, the layers tend to strip from the base.

A number of methods have been suggested for overcoming these difficulties. In the prior application of Gale F. Nadeau, Serial No. 1,547, filed January 12, 1935, there was described a subbing method in which a cellulose organic derivative film base was coated with a solution of a synthetic resin. Another method was described in the application of George S. Babcock, application Serial No. 27,409, filed June 19, 1935, in which a subbing solution consisting of a mixture of gelatin and a synthetic resin was used. In these processes the degree of adhesion is controlled by starting with a material containing a synthetic resin which adheres to the film base and then diluting this material or otherwise changing its properties so that the degree of adhesion is lessened and brittleness thereby reduced.

It is an object of the present invention to provide an improved subbing method in which adhesion is controlled by starting with a material which adheres poorly to the film support and regulating the properties of this material so that the adhesive point is approached from the direction of non-adhesion.

A further object is to provide a method of subbing photographic film which eliminates the use of cellulose nitrate and therefore reduces the fire hazard.

Other objects will appear from the following description of our invention.

These objects are accomplished by the use, as subbing materials, of cellulose esters of varying degrees of compatibility with the ester of which the support is made. The ester used in the subbing layer is one which is not completely compatible with the ester of the support, and which has a different chemical composition than the ester of the support.

In the accompanying drawing, we have shown in enlarged sectional views a number of modifications of photographic film made according to our invention. In the drawing.

The essential feature of our invention is the use, as a subbing layer, of a cellulose organic ester of known degree of compatibility with the ester of which the support is made. We define "compatibility" as the property of an ester, when mixed with a solution of another ester, of forming on drying a clear and homogeneous film, free from haze, graininess, or brittleness.

Compatibility of two esters may be measured in the following way. Solutions of the two esters are made up using a common solvent such as acetone, each of the solutions being of 5% strength. Equal proportions of the two solutions are thoroughly mixed, poured on a glass plate and allowed to form a film. If the esters are perfectly compatible, the film when dry will be clear and homogeneous. If the esters are slightly incompatible, there will be a perceptible haze or graininess in the dried film. If the esters are totally incompatible, the dry film will be hazy, grainy and brittle. Various intermediate stages of incompatibility may be classified by comparison with standards.

This property of compatibility is not important in itself, but it affords a reliable means of measuring the degree of adhesion which two esters will have when a solution of one is coated on a film of the other. We have found that, if two esters are compatible when tested in this way, the adhesion between them when a solution of one is coated on the film of another will be good and in general the degree of compatibility is a measure of the degree of adhesion. We have found no esters which are compatible when measured by the test described above which do not show good adhesion. To be useful, the ester chosen must lie between the limits of good compatibility and non-compatibility, or in other words, in the region defined as poorly or partially compatible.

The application of subbing layers used according to our invention may be carried out in any manner well-known to those skilled in the art. The film base or support may be any cellulose organic derivative composition usually used for this purpose. It may consist of a simple ester such as cellulose acetate, a mixed ester such as cellulose acetate propionate or cellulose acetate phthalate, or a mixed ether. For example, in coating a film base of hydrolyzed cellulose acetate, the subbing material may consist of a solution of a mixture of cellulose acetate propionate partially compatible with the base and gelatin. The solvent used may be acetone or a mixture of acetone and methyl alcohol. This solution is dried and the gelatin emulsion is coated over it or a gelatin layer may be applied between the subbing layer and the emulsion layer.

Other layers may also be applied to the film base in the usual way. For example, a gelatin coating may be applied to the reverse side of the support in order to counteract the tendency of the film to curl; a layer may be applied over the emulsion layer to resist abrasion or other intermediate subbing layers may be used.

Figure 1:
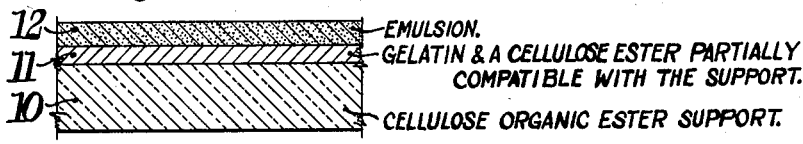
Fig. 1 is a sectional view of a film base having a subbing layer of gelatin and a cellulose ester only partially compatible with the ester of the base.

Referring to the accompanying drawing, Fig. 1 shows a film comprising a support 10 of a cellulose organic ester. The support is coated with a subbing layer 11 consisting of gelatin and a cellulose ester partially compatible with the ester of the support, coated from a suitable solvent. Over this subbing layer is laid the emulsion layer 12.

Figure 2:
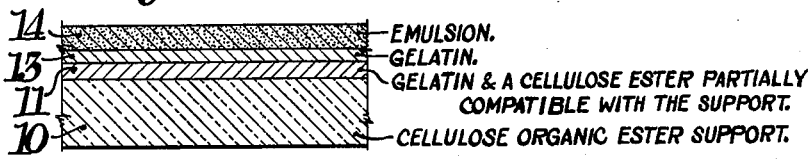
Fig. 2 is a sectional view of a film having a subbing layer similar to that shown in Fig. 1 but with an additional gelatin layer coated over the subbing layer.

Fig. 2 shows a film having a cellulose organic ester support 10 coated with a similar subbing layer 11 of gelatin and cellulose organic ester partially compatible with the ester of the support, over which is a thin gelatin layer 13 and the emulsion layer 14. This extra gelatin sub which is applied from a weak solution, that is, a solution of low solvent concentration, tends to decrease stripping of the layers when dry without increasing the brittleness.

Figure 3:
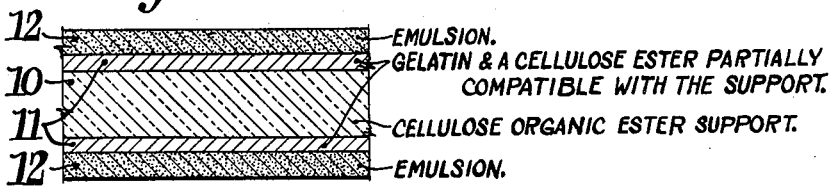
Fig. 3 is a sectional view of a film having subbing layers of gelatin and a cellulose ester only partially compatible with the ester of the support, and emulsion layers, on each side of the support.

Fig. 3 illustrates another modification of our invention, in which the cellulose organic ester support 10 is coated on both sides with subbing layers 11 of gelatin and a cellulose ester only partially compatible with the support and emulsion layers 12. This type of film is useful in certain types of photography, as for example, X-ray work. This type of film may also have an extra plain gelatin sub under the emulsion layer, as shown in Fig. 2.

Figure 4:
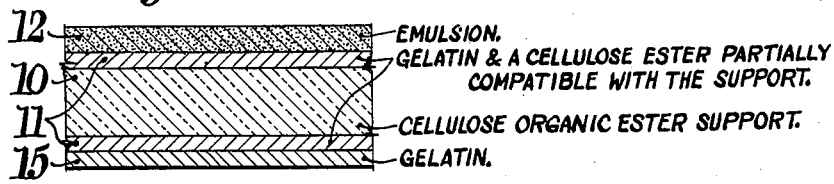
Fig. 4 is a sectional view of a film having a subbing layer of gelatin and a cellulose ester only partially compatible with the ester of the support, and a gelatin backing layer, on the side of the support opposite to the emulsion layer.

The film having a single emulsion layer may be backed with a gelatin layer to prevent the film from curling or as an anti-halation or abrasion-preventing coating. This type of film is shown in Fig. 4, in which the support 10 carries on one side the emulsion layer 12, coated over the layer 11 of gelatin and a cellulose ester only partially compatible with the support, and on the opposite side, a similar subbing layer 11 and a gelatin backing layer 15.

The following modifications of our invention, which are given by way of examples only, illustrate a number of types of subbing layers which we may use.

Example I

A film base of cellulose acetate hydrolyzed to such an extent that the precipitation value is 90% is coated at a linear speed of approximately three feet per minute with the following solution of gelatin and cellulose acetate propionate, fully esterified, and having a propionyl content of 16% and an acetyl content of 30%:

| | Per cent |
|---|---|
| Cellulose acetate propionate | 1.2 |
| Gelatin | 1.2 |
| Methyl alcohol | 28.3 |
| Acetone | 67.3 |
| Acetic acid (glacial) | 2.0 |

The film is then led through an appropriate drying apparatus maintained at a temperature of approximately 120 to 200° F. where the solvent is evaporated and the material is set or hardened. The usual gelatino-silver-halide coating is then applied by known technique to complete the film.

Example II

A film base of cellulose acetate hydrolyzed to such an extent that the precipitation value is 90% is coated as described in Example I with the following subbing solution of gelatin and fully esterified cellulose acetate propionate:

| | Per cent |
|---|---|
| Cellulose acetate propionate (fully esterified, propionyl 16%, acetyl 30%) | 0.9 |
| Cellulose acetate propionate (hydrolyzed propionyl 15.8%, acetyl 28.9%) | 0.3 |
| Gelatin | 1.2 |
| Methyl alcohol | 28.3 |
| Acetone | 67.3 |
| Acetic acid (glacial) | 2.0 |

This coating is dried and the emulsion layer is applied as described in the preceding example.

Example III

A film support of cellulose acetate hydrolyzed to such an extent that the precipitation value is 90% coated as described in Example I with the following solution of gelatin and mixed fully esterified and hydrolyzed cellulose acetate propionate:

| | Per cent |
|---|---|
| Cellulose acetate propionate (fully esterified, propionyl 35.9%, acetyl 13.3%) | 0.6 |
| Cellulose acetate propionate, (slightly hydrolyzed, propionyl 15.5%, acetyl 29%) | 0.6 |
| Gelatin | 1.2 |
| Methyl alcohol | 28.3 |
| Acetone | 67.3 |
| Acetic acid (glacial) | 2.0 |

This coating is dried and the emulsion layer applied as described in the preceding example.

Example IV

A film base of cellulose acetate hydrolyzed to such an extent that its precipitation value is 90% is coated as described in Example I with the following solution of fully esterified cellulose acetate propionate and gelatin:

| | Per cent |
|---|---|
| Cellulose acetate propionate (fully esterified, propionyl 35.9%, acetyl 13.3%) | 1.2 |
| Gelatin | 1.2 |
| Methyl alcohol | 28.3 |
| Acetone | 67.3 |
| Acetic acid (glacial) | 2.0 |

This solution is dried at a temperature of approximately 120 to 200° F. and the following weak gelatin solution is applied over it:

| | Per cent |
|---|---|
| Gelatin | 1 |
| Acetic acid | 1 |
| Water | 4 |
| Methyl alcohol | 74 |
| Methyl cellosolve | 20 |

This additional gelatin layer is dried and the usual gelatino-silver-halide emulsion is applied by known technique to complete the film.

Example V

A film base of fully esterified cellulose acetate propionate having a propionyl content of 16% and an acetyl content of 30% is coated as described in Example I with the following solution of gelatin and cellulose acetate hydrolyzed to such an extent that its precipitation value is 90%.

| | Per cent |
|---|---|
| Cellulose acetate | 1.2 |
| Gelatin | 1.2 |
| Methyl alcohol | 28.3 |
| Acetone | 67.3 |
| Acetic acid (glacial) | 2.0 |

The film is then dried and the emulsion coating applied as described in the preceding example.

Example VI

A film base of cellulose acetate propionate hydrolyzed in such a way that its propionyl content is 15.5% and its acetyl content is 29% is coated with the following solution of gelatin and cellulose acetate hydrolyzed to such an extent that its precipitation value is 70%.

| | Per cent |
|---|---|
| Cellulose acetate | 1.2 |
| Gelatin | 1.2 |
| Methyl alcohol | 28.3 |
| Acetone | 67.3 |
| Acetic acid (glacial) | 2.0 |

The film is then dried and the emulsion coating applied as described in the preceding examples.

Example VII

A film base of cellulose acetate hydrolyzed to an acetyl content of 40.5% (precipitation value 90%) is coated with the following solution of gelatin and cellulose acetate hydrolyzed to an acetyl content of 36% to 33%:

| | Per cent |
|---|---|
| Cellulose acetate | 1.2 |
| Gelatin | 1.2 |
| Methyl alcohol | 28.3 |
| Acetone | 67.3 |
| Acetic acid (glacial) | 2.0 |

The film is then dried and the emulsion coating applied as described in the preceding example.

The cellulose ester used in the subbing solution in this example has a different chemical composition than the base, since it is hydrolyzed to a greater extent, and hence has a lower acetyl content. It therefore conforms to the requirement satisfied by the subbing esters used according to our invention; namely, that the chemical composition of the subbing ester and support must be different. This requirement alone is, however, not sufficient, since the ester of the sub must also be one which is partially, but not completely compatible, with the ester of the support. Complete compatibility would result in brittleness of the film.

The following table shows how the compatibility of the sublayer with the base may be regulated and controlled. In the subbing formula of Example I, in which the sub-layer is coated on a support of 90% precipitation value cellulose acetate, the degree of compatibility may be regulated by using, in the subbing formula, cellulose acetate propionate hydrolyzed to the desired extent. In the formula of Example I, the cellulose acetate propionate is fully esterified, or unhydrolyzed. If cellulose acetate propionate of this type is hydrolyzed, the degree of compatibility is increased as shown in the following table, and the proper type may be selected for use in the subbing formula:

| | |
|---|---|
| Cellulose acetate propionate, unhydrolyzed | Slightly incompatible |
| Cellulose acetate propionate, hydrolyzed 4 hours to a precipitation value of 95.4% | Very slightly incompatible |
| Cellulose acetate propionate, hydrolyzed 8 hours to a precipitation value of 94.7% | Nearly compatible |

We have referred in the above examples to cellulose mixed esters hydrolyzed in such a way that various proportions of acyl groups are present. Mixed esters of these various compositions may be produced according to the processes described in Malm and Fletcher application Serial No. 551,546, filed January 17, 1931, and Kenyon and Van Dyke application, Serial No. 722,231, filed April 25, 1934.

We have also referred to the precipitation value of a number of cellulose esters. Precipitation value is the customary test used to determine the degree to which a cellulose organic ester has been hydrolyzed and is described in U. S. Patent No. 1,833,136. It is carried out as follows for testing a cellulose acetate:

Five grams of the dry cellulose ester are accurately weighed and placed in a wide mouth 12 oz. bottle. To this are added 100 cc. of acetone (commercial grade of 99% or better), the mixture is stirred until homogeneous. (The bottle should be closed during the stirring with a rubber stopper fitted with a shaft for the stirrer.) To this dope is added slowly from a pipette and with thorough stirring, 150 cc. of a mixture consisting of 2 parts of distilled water and 1 part acetone by volume. Care should be taken to keep the solvents and mixture at 20° C. wherever volumes are being measured.

At the end of the addition of the acetone-water mixture, a mixture is obtained containing 40% water by volume (neglecting contraction) in which is suspended the precipitated ester. This is allowed to stand for 12 hours at 20° C. and 25 cc. of the clearest portion (supernatent solution) are removed with a pipette. At the end of this time precipitation has reached equilibrium and proceeds no further, and during the same time settling of the precipitate occurs. This 25 cc. is centrifuged in stoppered bottles at high speed until the liquid is perfectly clear. Exactly 5 cc. of the clear liquid are removed with a pipette and evaporated to dryness on a tared watch glass. If W is the weight of the residue in grams the precipitation value which equals the per cent ester precipitated, $$= 100 - W \times \frac{250}{5} \times \frac{1}{5} \times 100$$
$$= 100 - 1000W$$

When the test is used for cellulose acetate-propionate, the final acetone-water mixture should contain 70% acetone and 30% water.

As shown in the above examples, the degree of adhesion, or its converse, the degree of stripping, is controlled by the type of ester used in the subbing solution and by the ratio of the ester to gelatin. The degree of adhesion may also be controlled by mixing two esters of different compatibility, and to a lesser extent by the choice of solvents. In this way, it is possible to select an ester or a subbing composition which is practically incompatible with the ester of the support or one which more closely approaches compatibility with the ester of the support. In this manner adhesion and stripping and brittleness properties can be effectively and completely controlled.

The customary tests by which the properties of our improved type of photographic films are determined will now be described. These are the so-called dry stripping, wet stripping, and brittleness or flexibility, tests.

The dry stripping test is carried out as follows: A piece of the complete emulsion-coated film of a convenient size, say, 6 inches wide by 40 inches long, is held at one end with both hands with the emulsion side toward the operator and is then torn lengthwise with successive quick motions of one hand, the tearing generally being carried out at a slight angle to the edge of the strip in order to obtain an oblique tear. The tears thus produced are more or less jagged. An attempt is now made to pull back the emulsion coating from the film with the fingernails and the degree to which the emulsion separates from the support is a measure of its adherence. It will, of course, be understood that the standards of emulsion adherence will vary for different types of film and what is considered satisfactory for one film may not be satisfactory for another. For example, stripping (emulsion adherence) is said to be satisfactory for X-ray film if the emulsion cannot be stripped back more than three or four inches. For Cine film, on the other hand, the stripping should not be greater than about ¼ of an inch.

The wet stripping test is carried out as follows: A strip of the emulsion-coated film of convenient size is soaked in water at 70° F. for ten minutes. It is then removed from the water and fixed on a flat surface with the emulsion side up. The emulsion is then gouged or creased with the fingernails at points near the middle and end of the strip, each nail scratch bearing the emulsion away from the support to a certain extent. The scratched places are then rubbed with considerable force with the balls of the fingertips for several seconds. A film is said to have satisfactory wet stripping (emulsion adherence) properties when no peeling, or substantially no peeling, of the emulsion occurs as a result of this rubbing action. Wet stripping is said to be unsatisfactory when an appreciable or large amount of the emulsion comes off. For most types of film it should not be possible, to remove pieces wider than ¼ inch by this test.

The brittleness test is carried out as follows: A strip of film of convenient size is heated for forty-five minutes in a brittleness oven in which air having a controlled relative humidity of 20–25% and a temperature of 110–120° F. is circulated. The film is then removed from the oven and folded at ten different places along the strip by pressing the fold suddenly between the forefinger and the thumb. If the film is brittle, this sudden folding will cause it to break or snap in two at the fold. The flexibility may be defined in terms of freedom from brittleness which may be figured directly in percentages from the results of the test. For example, a film is said to be 60% free from brittleness if it ruptures at only four out of ten folds.

We have described in the above examples film supports of cellulose acetate or cellulose acetate propionate and subbing esters of similar composition. It is to be understood, however, that we are not limited to these particular esters. The film support may be any type of colloidal material which is suitable for forming transparent sheets such as cellulose acetate, cellulose propionate, cellulose butyrate, cellulose acetate propionate, cellulose acetate phthalate, cellulose ethers, etc. The ester used in the subbing solution may be a fully esterified or a hydrolyzed ester possessing the proper degree of compatibility with the ester of the support. In the case of mixed esters, the ratio between the acyl groups may vary over wide ranges and may be higher or lower than the acyl content of the support.

Our subbing method may be applied not only to the subbing of cellulose organic derivative film base but also to the subbing of film base formed of resinous material such as a synthetic resin. The test of compatibility and the general rules described with reference to the compatibility of cellulose esters is also applicable to incompatibility between most esters and synthetic resins.

It is to be understood that the modification described in the above specification are by way of example only and that our invention is to be limited only by the scope of the appended claims.

What we claim:

1. A photographic element comprising a support of a colloidal material, an emulsion layer, and between said support and said emulsion layer, a layer of gelatin and a cellulose organic acid ester of different chemical composition than the colloidal material comprising the support, and only partially compatible with the material of the support, said last-mentioned layer being in direct contact with said support, the element being substantially free from peeling and brittleness.

2. A photographic element comprising a cellulose organic acid ester support, an emulsion layer, and between said support and said emulsion layer, a layer of gelatin and a cellulose organic acid ester of different chemical composition than that of the ester comprising the support, the ester mixed with the gelatin being only partially compatible with the ester of the support, said last-mentioned layer being in direct contact with said support, and the element being substantially free from peeling and brittleness.

3. A photographic element comprising a cellulose acetate support, an emulsion layer, and between said support and said emulsion layer, a layer of gelatin and a cellulose organic acid ester of different chemical composition than that of the ester comprising the support, the ester mixed with the gelatin being only partially compatible with the ester of the support, said last-mentioned layer being in direct contact with said support, and the element being substantially free from peeling and brittleness.

4. A photographic element comprising a cellulose acetate support, an emulsion layer, and between said support and said emulsion layer, a layer of gelatin and cellulose acetate propionate which is only partially compatible with the ester of the support, but which adheres to the support, said last-mentioned layer being in direct contact with said support, the film being substantially free from peeling and brittleness.

5. A photographic element comprising a cellulose organic acid ester support, a silver halide emulsion layer, and between said support and said emulsion layer, a layer of gelatin and a cellulose organic acid ester of different chemical composition than that of the ester comprising the support, the ester mixed with the gelatin being only partially compatible with the ester of the support, said last-mentioned layer being in direct contact with said support, and the element being substantially free from peeling and brittleness.

6. A photographic element comprising a synthetic resin support, an emulsion layer, and between said support and said emulsion layer, a layer of gelatin and a cellulose organic acid ester which is only partially compatible with the synthetic resin of the support, said last-mentioned layer being in direct contact with said support, the element being substantially free from peeling and brittleness.

7. A photographic element comprising a support of a colloidal material, an emulsion layer, and between said support and said emulsion layer, a layer of gelatin and a cellulose organic acid ester of different chemical composition than the colloidal material comprising the support, and only partially compatible with the material of the support, the respective layers of the element being in direct contact with each other, and the element being substantially free from peeling and brittleness.

8. A photographic element comprising a cellulose organic acid ester support, an emulsion layer, and between said support and said emulsion layer, a layer of gelatin and a cellulose organic acid ester of different chemical composition than that of the ester comprising the support, the ester mixed with the gelatin being only partially compatible with the ester of the support, the respective layers of the element being in direct contact with each other, and the element being substantially free from peeling and brittleness.

9. A photographic film substantially free from peeling and brittleness, comprising a cellulose organic acid ester support, and in order thereon, a layer of gelatin and a cellulose organic acid ester of different chemical composition than that of the ester comprising the support and only partially compatible with the ester comprising the support, a gelatin layer, and a photographic emulsion layer, the several layers mentioned being in direct contact with each other.

GALE F. NADEAU.
CLEMENS B. STARCK.